(12) United States Patent
Katsumata et al.

(10) Patent No.: US 7,692,095 B2
(45) Date of Patent: Apr. 6, 2010

(54) WIRE HARNESS LEAD-OUT STRUCTURE OF PROTECTOR

(75) Inventors: Toshihiro Katsumata, Utsunomiya (JP); Mitsuharu Suzuki, Utsunomiya (JP); Shintaro Suzuki, Utsunomiya (JP); Jun Ishida, Wako (JP); Masahiko Sakai, Wako (JP); Takuya Tajika, Tochigi (JP)

(73) Assignees: Yazaki Corporation, Tokyo (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/195,011

(22) Filed: Aug. 20, 2008

(65) Prior Publication Data

US 2009/0050350 A1 Feb. 26, 2009

(30) Foreign Application Priority Data

| Aug. 21, 2007 | (JP) | ............................. 2007-214589 |
| Aug. 21, 2007 | (JP) | ............................. 2007-214590 |
| Aug. 21, 2007 | (JP) | ............................. 2007-214874 |
| Aug. 21, 2007 | (JP) | ............................. 2007-214875 |

(51) Int. Cl.
*H02G 3/00* (2006.01)
(52) U.S. Cl. .................. 174/72 R; 174/72 A; 174/72 C
(58) Field of Classification Search ............... 174/65 R, 174/135, 31 R, 68.1, 72 A, 72 R, 74 R, 74 A, 174/91, 73.1, 82, 94 R, 65 G; 248/68.1; 135/108, 135/109; 285/93, 94
See application file for complete search history.

(56) References Cited

U.S. PATENT DOCUMENTS

| 5,046,766 | A | * | 9/1991 | Lomberty et al. ........... 285/419 |
| 6,595,473 | B2 | * | 7/2003 | Aoki et al. .................. 248/74.4 |
| 6,627,817 | B1 | * | 9/2003 | Kortenbach ............... 174/74 R |
| 6,668,865 | B2 | * | 12/2003 | Miyamoto et al. .......... 138/108 |
| 6,732,764 | B2 | * | 5/2004 | Miyamoto et al. .......... 138/110 |
| 6,875,918 | B2 | * | 4/2005 | Sudo et al. .................. 174/363 |

FOREIGN PATENT DOCUMENTS

JP 2004-229351 A 8/2004

* cited by examiner

*Primary Examiner*—William H Mayo, III
(74) *Attorney, Agent, or Firm*—Morgan, Lewis & Bockius LLP

(57) ABSTRACT

A wire harness lead-out structure includes a body that includes a containing portion for receiving a wire harness and a corrugated tube covering the wire harness, a lid that is attached to the body to close an upper opening of the body, two completely-fixing ribs that are formed on the body and the lid respectively to be engaged in grooves of the corrugated tube to prevent a movement of the corrugated tube in an axial direction of the corrugated tube, and a provisionally-fixing rib that is formed in a single line on the opposed side walls of the body to be engaged in a single groove of the corrugated tube, and is disposed between the two completely-fixing ribs. The wire harness lead-out structure length required for provisionally fixing a corrugated tube can be reduced and a compact design can be achieved.

2 Claims, 11 Drawing Sheets

WIRE HARNESS LEAD-OUT STRUCTURE OF PROTECTOR

BACKGROUND

This invention relates to a wire harness lead-out structure of a protector having a corrugated tube-fixing function.

In many cases, a corrugated tube has been mounted at a wire harness lead-out portion of a protector (from which a wire harness is led out) for protection purposes. In such a case, fixing ribs for being engaged in concave grooves (valley portions) in an outer periphery of the corrugated tube so as to prevent the disengagement of the corrugated tube are provided at the wire harness lead-out portion of the protector.

In the case of a protector described in Patent Literature 1, two completely-fixing ribs and two provisionally-fixing ribs (which are disposed between the two completely-fixing ribs) are provided at a wire harness lead-out portion, and a pressing wall for being pressed against an outer peripheral surface of a ridge (mountain portion) of a corrugated tube is provided between the two provisionally-fixing ribs.

The two provisionally-fixing ribs and the single pressing wall disposed therebetween are provided for the purpose of provisionally fixing the corrugated tube against disengagement, that is, movement toward an upper opening of a protector body before the corrugated tube is completely fixed by the completely-fixing ribs upon closing of the upper opening by a lid

[Patent Literature 1] JP-A-2004-229351 (FIGS. 5 and 6)

As described above, the corrugated tube has heretofore been provisionally fixed by the two provisionally-fixing ribs and the single pressing wall disposed therebetween, and as a length for effecting the provisional fixing, a length covering three consecutive ridges of the corrugated tube has been required.

SUMMARY

This invention has been made in view of the above circumstances, and an object of the invention is to provide a wire harness lead-out structure in which a length required for provisionally fixing a corrugated tube can be reduced, so that a compact design of a protector can be achieved, which can contribute to the saving of natural resources.

The above object has been achieved by a wire harness lead-out structure, comprising:

a body that includes a containing portion for receiving a wire harness and a corrugated tube covering the wire harness;

a lid that is attached to the body to close an upper opening of the body;

two completely-fixing ribs that are formed on the body and the lid respectively to be engaged in grooves of the corrugated tube to prevent a movement of the corrugated tube in an axial direction of the corrugated tube; and a provisionally-fixing rib that is formed in a single line on the opposed side walls of the body to be engaged in a single groove of the corrugated tube, and is disposed between the two completely-fixing ribs, wherein the completely-fixing ribs are arranged in two lines corresponding to two grooves of the corrugated tube, the two grooves being both adjacent to the single groove corresponding to the provisionally-fixing rib;

wherein each of the completely-fixing ribs on the body is formed into a U-shape along an inner periphery of the containing portion so that a distance between upper portions of the completely-fixing rib respectively formed on opposed side walls of the body is constant;

wherein a distance between portions of the provisionally-fixing rib formed on the opposed side walls is gradually decreased toward the upper opening of the body to prevent the corrugated tube from moving toward the upper opening of the body when the provisionally-fixing rib is engaged in the single groove of the corrugated tube;

wherein pressing walls are provided among the provisionally-fixing rib and the two completely-fixing ribs to respectively press ridges of the corrugated tube, the ridges being disposed between the grooves corresponding to the completely-fixing ribs; and wherein a distance between portions of each pressing wall formed respectively on the opposed side walls is gradually decreased toward the upper opening of the body to prevent the corrugated tube from moving toward the upper opening of the body when the pressing walls press the ridges of the corrugated tube.

In the wire harness lead-out structure of the above construction, the provisional fixing of the corrugated tube is effected by the provisionally-fixing rib arranged in the single line and the pressing walls disposed at the opposite sides of the provisionally-fixing rib, and therefore the range required for the provisional fixing can be changed from a length covering three consecutive ridges of the corrugated tube to a length covering two consecutive ridges, and thus can be reduced by an amount corresponding to one ridge. Therefore, the length of a wire harness lead-out portion of a protector can be reduced, and this contributes to the saving of natural resources. And besides, since the wire harness lead-out structure can thus be reduced, the amount of the wire harness to be received within the protector can be increased, or the wire harness can be more freely arranged and installed when the protector is mounted on a vehicle.

In the present invention, the length required for provisionally fixing the corrugated tube can be reduced, so that a compact design of the protector can be achieved, which can contribute to the saving of natural resources.

According to the present invention, there is also provided a circuit protector for receiving a wire bundle including a wire, comprising:

a housing; and a wire holding portion which is provided on the housing to hold the wire in a state that the wire extends from an interior of the housing to an exterior thereof so as to have a loop-shape, and the wire holding portion having a U-shaped cross-section, wherein a width of the holding portion is smaller than that of the wire.

Preferably, the wire holding portion is formed into an elongated shape, and extends in a wire-installing direction.

Preferably, a plurality of the wire holding portions are provided so as to be spaced from each other in the wire-installing direction.

Preferably, an open portion of the wire holding portion is closed by a lid for closing an upper opening of the housing.

By the above configurations, when the wire extending from the interior of the housing does not need to be spread, the wire is fixed in the superposed condition to a side face of the housing, and therefore the wire will not interfere with other neighboring parts, and the wire, when necessary, is pulled out from the interior of the housing, and can be easily spread.

By the above configurations, the single wire holding portion is merely formed on the housing, and with this simple construction, the wire can be fixed, and therefore the protector can be easily produced.

By the above configurations, by selecting a desired one of the plurality of wire holding portions spaced from each other in the wire-installing direction, the length of installation of the wire along the side face of the housing can be adjusted.

By the above configurations, since the open portion of the wire holding portion is closed, the wire held by the wire holding portion will not be withdrawn therefrom.

In the present invention, the wire holding portion is provided on the housing of the circuit protector, and therefore the wire extending from the interior of the housing can be held by the wire holding portion to be fixed to the housing, and the wire can be mounted on the housing without using any jig or the like. And besides, the wire is folded back to be superposed on itself, and is returned into the housing, and therefore the wire, only when necessary, can be spread into the loop-shape, and therefore this protector can be easily handled.

Although the above configuration is suitably applied to the protector used for inspecting an ignition timing of an engine, etc., the purpose and use of the operation are not limited in so far as one wire is pulled out from a wire bundle so as to carry out this operation.

According to the present invention, there is also provided a wire harness protector, comprising:

a protector body which has a wire installation path formed therein;

a lid which is attached to the protector body to close an upper opening of the protector body; and fixing members which are provided at the protector body and the lid to fix the protector body and the lid to each other when the lid attached to the protector body, wherein the protector body includes at least three trough-shaped wire lead-out portions arranged in a row and oriented in the same direction;

wherein the fixing members are provided at outer side walls of the opposite-end wire lead-out portions;

wherein an insertion space is provided at an outer side of a side wall of the central wire lead-out portion; and wherein a projecting piece portion is formed on the lid, and is inserted into the insertion space, and when the lid is lifted at the central wire lead-out portion, the projecting piece portion is pressed against the side wall of the central wire lead-out portion in accordance with the bending of the lid to limit the lifting of the lid.

Preferably, a protector body-side corrugated tube-fixing portion for fixing a corrugated tube covering the wire is provided on at least one wire lead-out portion provided at a center among the three trough-shaped wire lead-out portions, and a lid-side corrugated tube-fixing portion is provided on that portion of an inner surface of the lid corresponding to the protector body-side corrugated tube-fixing portion, and cooperates with the protector body-side corrugated tube-fixing portion to fix the corrugated tube.

By the above configurations, wires are received in the wire installation path formed within the protector body, and are led out respectively from the wire lead-out portions, and in this condition, the lid is put on the protector body, and is fixed thereto, so that the projecting piece portion provided at the lid is inserted into the insertion space provided at the protector body. In this condition, when a force tending to lift the lid at the central wire lead-out portion acts on the lid, the lid is bent such that its central portion is lifted, since the opposite ends of the lid are fixed. However, as the lid is thus bent, the projecting piece portion is pressed against the side wall of the central wire lead-out portion, and therefore the bending of the lid is limited by this frictional resistance, so that the lifting of the central portion of the lid can be limited.

By the above configurations, the corrugated tube is mounted on the outer periphery of at least the wire led out from the central wire lead-out portion, and when the protector body and the lid are fixed to each other, the protector body-side corrugated tube-fixing portion and the lid-side corrugated tube-fixing portion cooperate with each other to fix the corrugated tube. At this time, the lifting of the central portion of the lid is limited by the action of the protecting piece portion as described above, and therefore the functions of the protector body-side corrugated tube-fixing portion and lid-side corrugated tube-fixing portion will not be adversely affected, and the displacement and disengagement of the corrugated tube can be prevented.

By the above configurations, the lifting of the lid can be effectively prevented without the need for unduly increasing the number of the fixing member.

According to the present invention, there is also provided a wire harness protector, comprising:

a protector body including a peripheral wall of a U-shaped cross-section which is open at its upper side so as to define a wire installation path;

a lid which is attached to the protector body to close an upper opening of the protector body; and a pressing piece portion which is formed on and projects from an inner surface of a side wall portion of the peripheral wall of the protector body to presses a wire, installed in the wire installation path, away from the side wall portion in a direction of a width of the wire installation path to hold the wire apart from the side wall portion.

Preferably, the pressing piece portion is provided at an inner side of an abruptly-bent portion of the wire installation path.

Preferably, the abruptly-bent portion is provided at a region where a branch wire installation path of a branch wire lead-out portion extends from a main portion of the wire installation path.

Preferably, a peripheral wall of the branch wire lead-out portion is connected to the peripheral wall of the main wire installation path such that an upper edge of the former peripheral wall is disposed at a level lower than an upper edge of the latter peripheral wall.

Preferably, an upper edge of the pressing piece portion is disposed at a level higher than the upper edge of the peripheral wall of the branch wire lead-out portion.

Preferably, the peripheral wall of the branch wire lead-out portion is connected obliquely to the peripheral wall of the main wire installation path, and the pressing piece portion is formed on the inner surface of the side wall portion of the peripheral wall of the main wire installation path, and is disposed at the inner side of the acutely-bent connection portion thereof, and the pressing piece portion extends to a region disposed near to a widthwise-central portion of the branch wire lead-out portion, and a branch wire guide portion is formed at a distal end of the pressing piece portion.

Preferably, the pressing piece portion is in the form of a blade-like spring piece which projects from the inner surface of the side wall portion of the peripheral wall of the protector body, and then is curved into an L-shape from an upstream side toward a downstream side in a wire installation direction.

Preferably, the branch wire guide portion for guiding a branch wire is formed at the distal end of the pressing piece portion, and the branch wire guide portion is formed into a cylindrical tubular shape or a cylindrical shape.

By the above configurations, the wire can be held apart from the side wall portion (forming the wire installation path) by the action of the pressing piece portion. Therefore, the wire is prevented from being disposed on the upper edge of the side wall portion in the wire installation operation, and the wire is effectively prevented from being held between (or gripped by) the protector body and the lid when the lid is closed. Therefore, it is not particularly necessary to wind a tap on the wire (wire harness) to prevent it from becoming loose, and the time and labor required for such tape winding operation are saved, and the omission of such wound tapes contributes to the saving of natural resources. Furthermore, without using such wound tapes, the wire harness can be easily disassembled, and therefore the disassembling ability can be enhanced.

By the above configurations, there is a strong possibility that at a region where the wire is installed in an abruptly-bent condition, the wire tends to follow the shortest route at the inner side of the bent portion, and is disposed on the edge of the side wall portion. However, by the action of the pressing piece portion, the wire is prevented from being disposed on the edge of the side wall portion, and therefore is effectively prevented from being gripped when the lid is closed.

By the above configurations, there is a strong possibility that at a region where the branch wire is branched off from the main wire portion of the wire bundle (wire harness), the wire tends to follow the shortest route at the inner side of the bent portion (for branching purposes), and is disposed on the edge of the side wall portion. However, by the action of the pressing piece portion, the wire is prevented from being disposed on the edge of the side wall portion, and therefore is effectively prevented from being gripped when the lid is closed.

By the above configurations, when the branch wire is installed at a position lower than the main wire portion, the branch wire is liable to be disposed on the edge of the side wall portion at the branching region. However, this can be avoided by the action of the pressing piece portion, and therefore the gripping of the wire occurring when the lid is closed is effectively prevented.

By the above configurations, the upper edge of the pressing piece portion is disposed at the level higher than the upper edge of the peripheral wall of the branch wire lead-out portion, and therefore the wire is more effectively prevented from being disposed on the edge of the peripheral wall.

By the above configurations, when the branch wire is bent in a U-turn manner, the wire is liable to be disposed on the edge of the peripheral wall at the inner side of this bent portion. However, this can be avoided by the action of the pressing piece portion, and therefore the wire is effectively prevented from being gripped when the lid is closed.

By the above configurations, the pressing piece portion is in the form of the blade-like spring piece, and therefore it can resiliently hold the wire apart from the side wall portion. And besides, even when the wire is bent abruptly, the wire can be smoothly guided because of the resiliency of the pressing piece portion.

By the above configurations, the branch wire guide portion of a cylindrical tubular shape or a cylindrical shape is formed at the distal end of the pressing piece portion, and therefore the area of contact with the wire is increased, and the wire can be guided by a curved surface defining the outer periphery of this branch wire guide portion, so that a pressure applied to the wire is reduced, thereby reducing damage to the wire.

In the present invention, in the wire installation operation, the wire is prevented from being held between the protector body and the lid, and also the need for a tape winding operation in the vicinity of the wire branch portion within the protector can be obviated, thus enhancing a disassembling ability.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1A is a perspective view showing an open condition of a lid, and FIG. 1B is an enlarged plan view showing a body;

FIG. 3A is a perspective view showing an open condition of a lid, and FIG. 3B is an enlarged plan view showing a body;

FIG. 12A is a plan view showing an open condition of a lid, and FIG. 12B is an enlarged perspective view of a portion indicated by arrow Ib of FIG. 12A; FIG. 13A is a plan view showing an open condition of a lid, and FIG. 13B is an enlarged perspective view of a portion indicated by arrow IIb of FIG. 13A.

DETAILED DESCRIPTION OF EXEMPLARY EMBODIMENTS

Preferred embodiments of the present invention will now be described in detail with reference to the drawings.

Figure 1A:
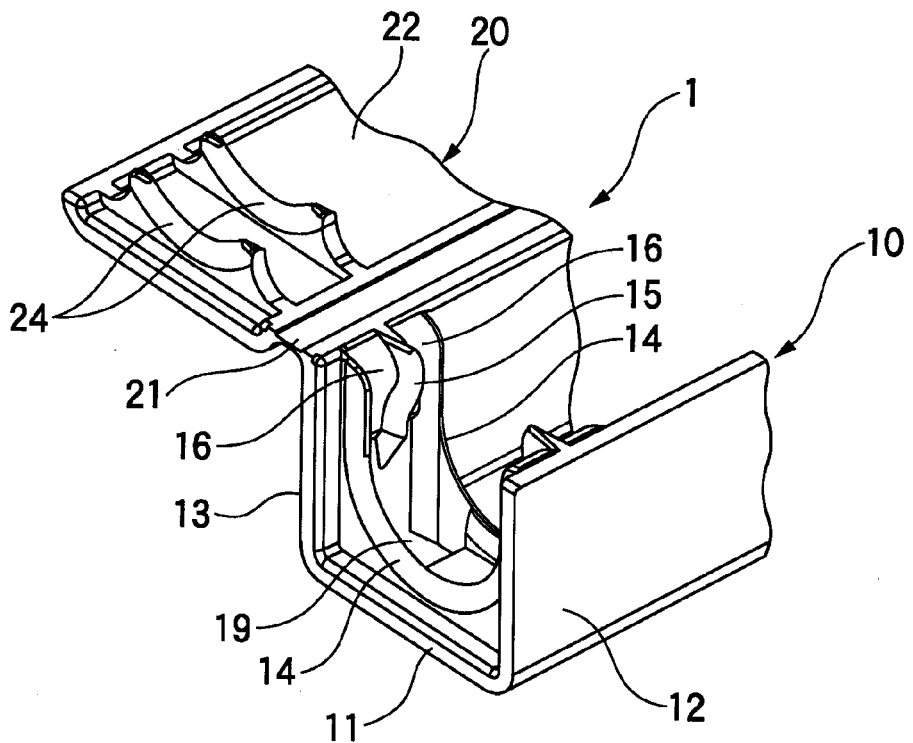
FIGS. 1A and 1B show one preferred embodiment of a wire harness lead-out structure of the present invention.
Figure 1B:
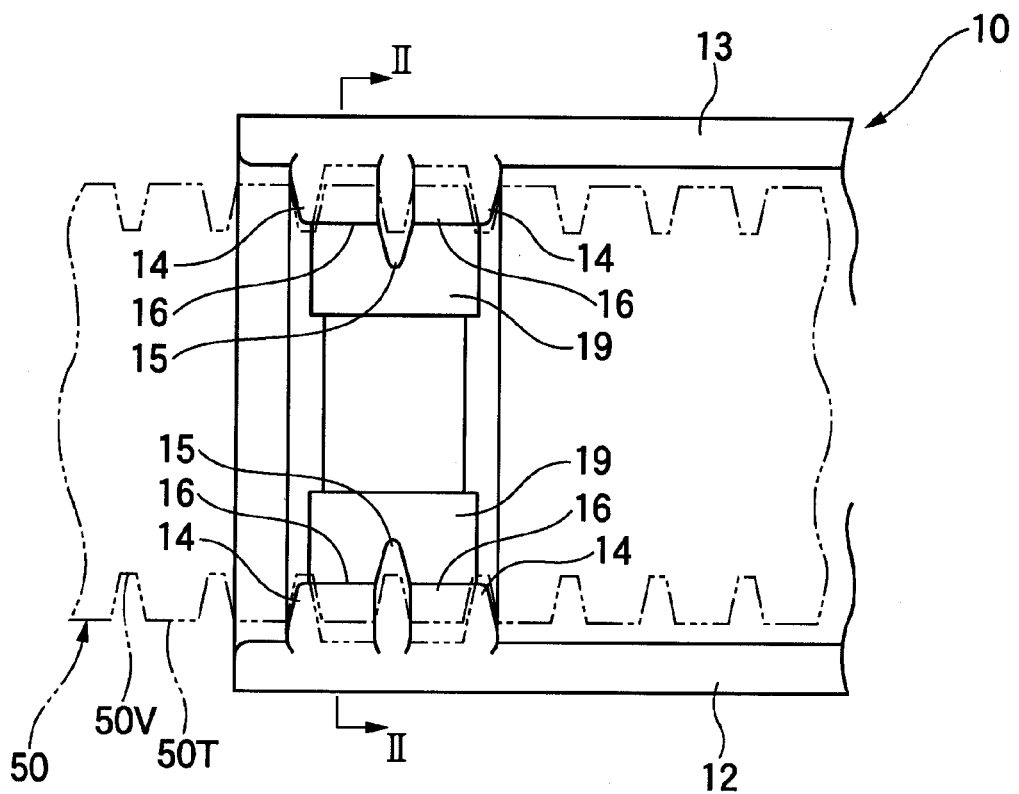
Figure 2:
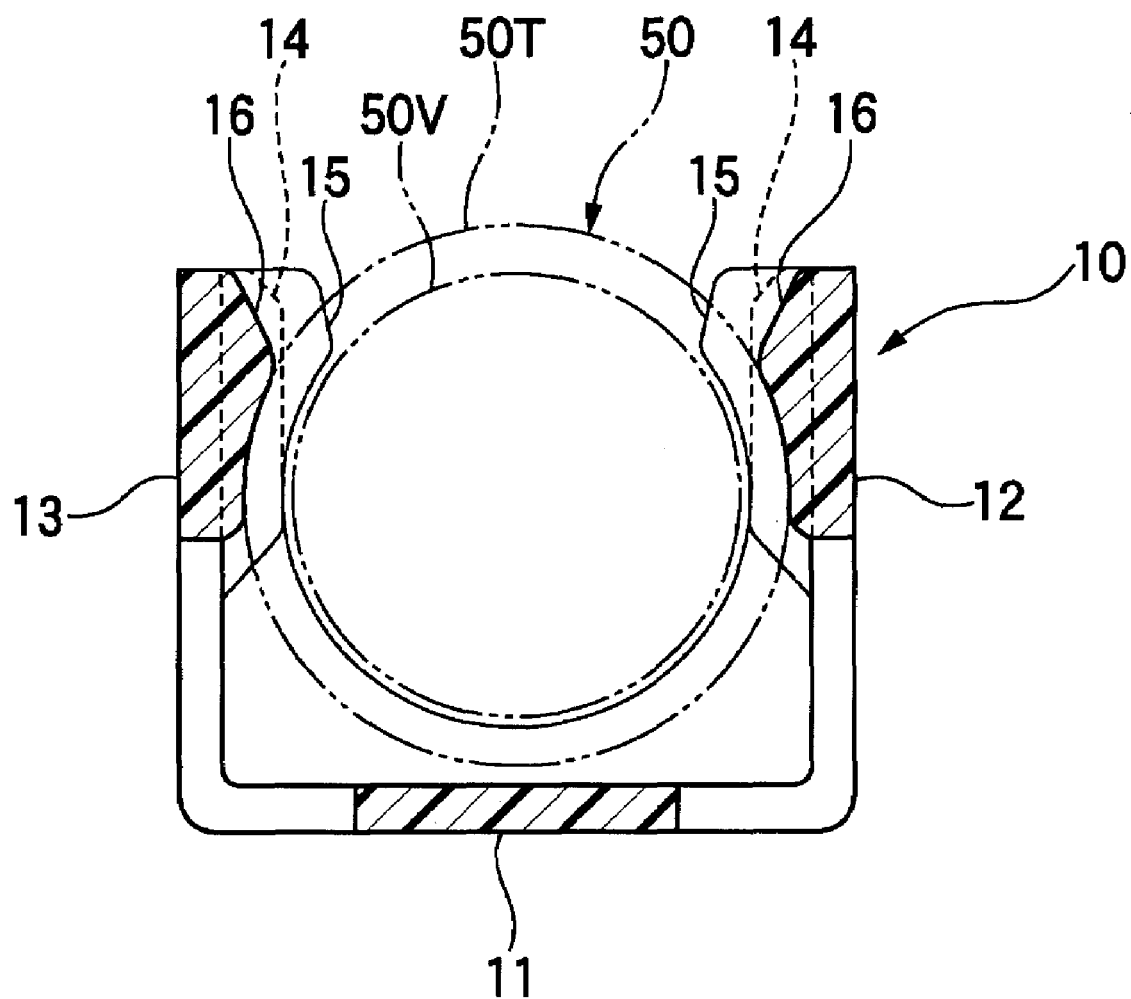
FIG. 2 is a cross-sectional view taken along the line II-II of FIG. 1B.

FIGS. 1A and 1B show a first embodiment of a wire harness lead-out structure of the present invention, and FIG. 1A is a perspective view showing an open condition of a lid, and FIG. 1B is an enlarged plan view showing a body. FIG. 2 is a cross-sectional view taken along the line II-II of FIG. 1B. This wire harness lead-out portion 1 is provided as part of a protector for protecting a wire harness, and includes the body 10, and the lid 20. The body 10 is provided as part of a protector body, and the lid 20 is provided as part of a protector lid.

The body 10 includes a bottom wall 11, and a pair of side walls 12 and 13, and is open at its upper side to provide an upper opening, and therefore is formed into a U-shaped cross-section. The lid 20 is in the form of a plate-like member 22, and is adapted to be put on the body 10 to close the upper opening of the body 10. The body 10 and the lid 20 are interconnected by a hinge 21 such that the body 10, the lid 20 and the hinge 21 are formed into an integral construction as a one-piece resin-molded product. The lid 20 can be pivotally moved while bending the hinge 21, and can close the upper opening of the body 10, and can be locked to the body 10 in this closed condition by a lock mechanism (not shown).

The following structure serving as a corrugated tube-fixing member is provided at this wire harness lead-out portion 1, and is disposed in the vicinity of an outlet thereof.

Completely-fixing ribs 14 and 24 are formed on an inner periphery of the body 10 and an inner surface of the lid 20, and are adapted to be engaged in concave grooves 50V in an outer periphery of a corrugated tube 50 to prevent the movement of the corrugated tube 50 in an axial direction. The completely-fixing ribs 14 and 24 are arranged in two lines (that is, in two planes) corresponding to two grooves 50V of the corrugated tube 50 which are spaced from each other with one groove 50V disposed therebetween.

Each of the completely-fixing ribs 14 on the body 10 is formed into a U-shape along the inner periphery of the body 10 such that the distance between upper half portions of the completely-fixing rib 14 formed respectively on the opposed side walls 12 and 13 is constant.

A pair of provisionally-fixing ribs 15 for being engaged in the groove 50V in the outer periphery of the corrugated tube 50 are formed respectively on the inner surfaces of the opposed side walls 12 and 13 of the body 10, and are disposed midway between the two completely-fixing ribs 14. The distance between the pair of provisionally-fixing ribs 15 (arranged in the single line) formed respectively on the opposed side walls 12 and 13 is gradually decreasing toward the upper side so that the provisionally-fixing ribs 15, when engaged in the groove 50V of the corrugated tube 50, can provisionally fix the corrugated tube 50 to prevent this corrugated tube 50 from moving toward the upper opening of the body 10.

Further, a pair of pressing walls 16 are provided between the provisionally-fixing ribs 15 and one completely-fixing rib 14, and are formed respectively on the inner surfaces of the opposed side walls 12 and 13 of the body 10, while another pair of pressing walls 16 are provided between the provisionally-fixing ribs 15 and the other completely-fixing rib 14, and are formed respectively on the inner surfaces of the opposed side walls 12 and 13 of the body 10. These pressing walls 16 are adapted to be pressed against outer peripheral surfaces of those ridges 50T of the corrugated tube 50 disposed adjacent respectively to the grooves 50V in which the completely-fixing ribs 14 are engaged, respectively. The distance between each pair of pressing walls 16 formed respectively on the opposed side walls 12 and 13 is gradually decreasing toward the upper side so that the pressing walls 16, when pressed against the outer peripheral surface of the ridge 50T of the corrugated tube 50, can provisionally fix the corrugated tube 50 to prevent this corrugated tube 50 from moving toward the upper opening of the body 10.

In FIGS. 1A and 1B, reference numeral 19 denotes a mold-removing hole for molding the provisionally-fixing ribs 15 and the pressing walls 16.

Next, the operation will be described.

When this wire harness lead-out portion 1 is to be used, the lid 20 is opened as shown in FIG. 1A, and in this condition a wire harness (not shown) and the corrugated tube 50 are inserted into the body 10 through the upper opening thereof. At this time, grooves 50V of the corrugated tub 50 are engaged with the completely-fixing ribs 14 and the provisionally-fixing ribs 15. As a result, outer peripheral surfaces of ridges 50T of the corrugated tube 50 are pressed against the pressing walls 16. In this condition, the corrugated tube 50 is provisionally fixed to be prevented from being withdrawn upwardly, since the distance between the upper end portions of the provisionally-fixing ribs 15, as well as the distance between the upper end portions of each pair of pressing walls 16, is made smaller.

Then, the lid 20 is put on the body 10, and is locked thereto. By doing so, the completely-fixing ribs 14 and 24 of the body 10 and lid 20 are fitted in the grooves 50V of the corrugated tube 50, thereby completely fixing the corrugated tube 50.

In this case, the provisional fixing of the corrugated tube 50 is effected by the pair of provisionally-fixing ribs 15 arranged in the single line and the two pairs of pressing walls 16 disposed at the opposite sides of the provisionally-fixing ribs 15, and therefore the range required for the provisional fixing can be made equal to a length covering two consecutive ridges of the corrugated tube 50. Incidentally, if the corrugated tube 50 is held merely by the provisionally-fixing ribs 15 arranged in the single line, there is a fear that the corrugated tube 50 may be damaged when mounting it in the wire harness lead-out portion 1. In the invention, however, the pressing walls 16 disposed at the opposite sides of the provisionally-fixing ribs 15 are pressed against the outer peripheral surfaces of the ridges 50T, and therefore the corrugated tube 50 can be provisionally fixed without applying an undue force.

Figure 3A:
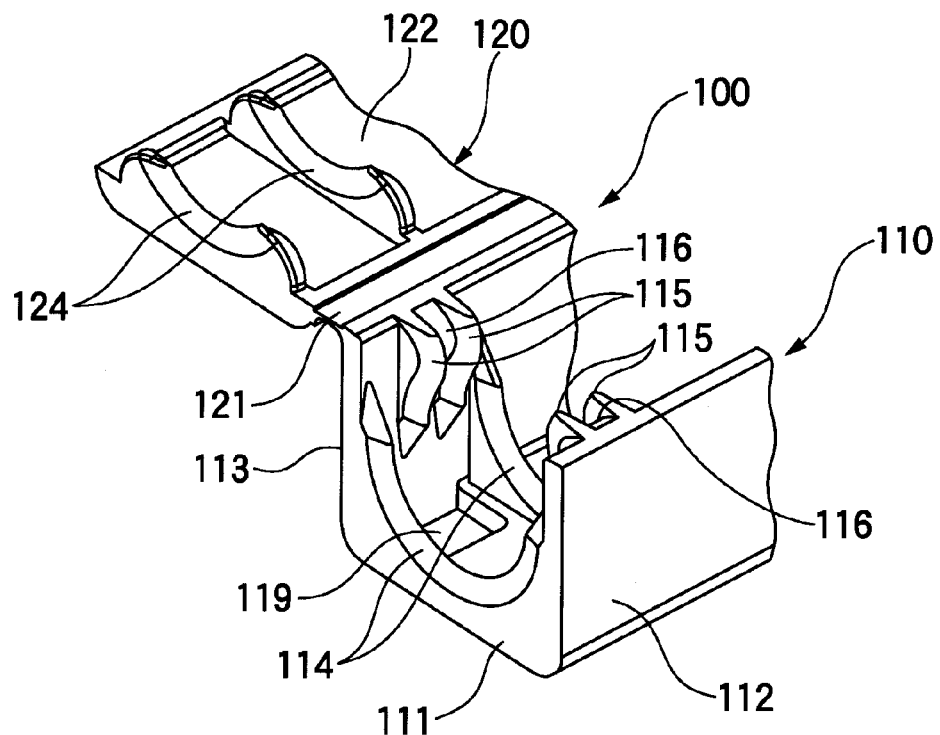
FIGS. 3A and 3B are views of a comparative wire harness lead-out structure shown for explaining advantages of the embodiment of the invention.
Figure 3B:
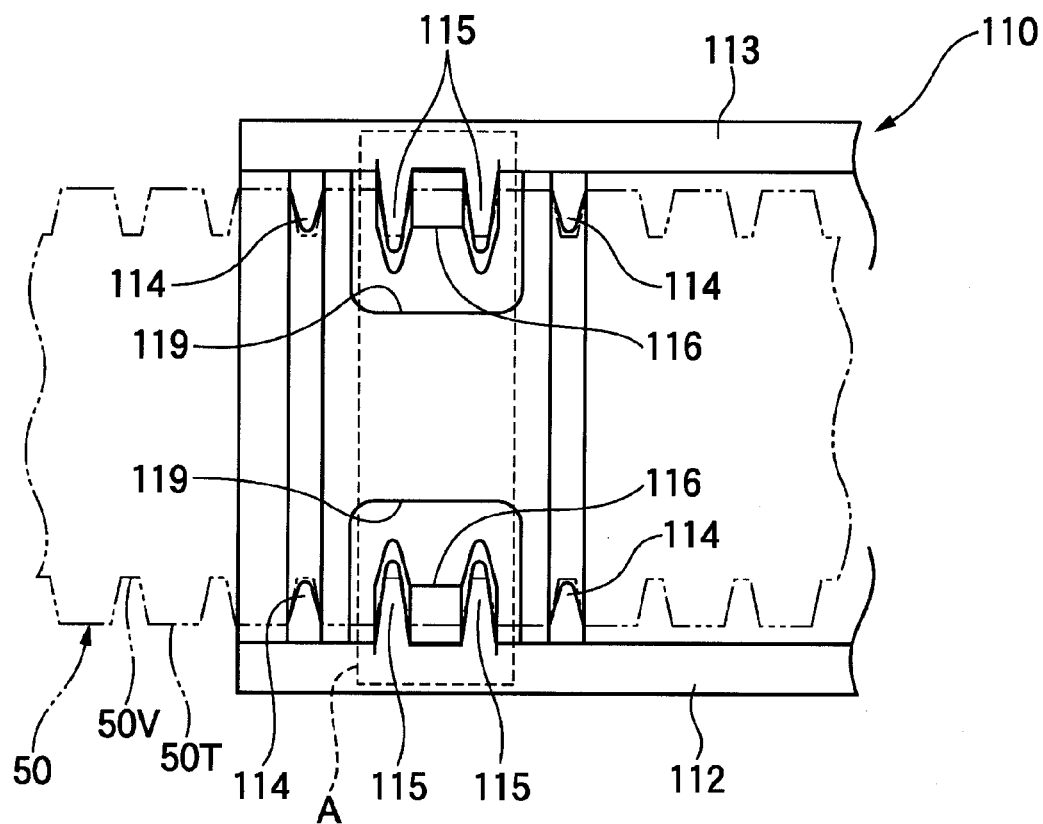

FIGS. 3A and 3B are views of a comparative example shown for explaining advantages of the embodiment of the invention. FIG. 3A corresponds to FIG. 1A, and FIG. 3B corresponds to FIG. 1B.

This comparative wire harness lead-out portion 100 includes a body 110, and a lid 120, and the body 110 and the lid 120 are interconnected by a hinge 121. The body 110 includes a bottom wall 111, and a pair of side walls 112 and 113, and has an U-shaped cross-section. The lid 120 is in the form of a plate-like member 122.

Completely-fixing ribs 114 and 124 are formed on an inner periphery of the body 110 and an inner surface of the lid 120, and are adapted to be engaged in grooves 50V in an outer periphery of a corrugated tube 50 to prevent the movement of the corrugated tube 50 in an axial direction. The completely-fixing ribs 114 and 124 are arranged in two lines (that is, in two planes) corresponding to two grooves 50V of the corrugated tube 50 which are spaced from each other with two grooves 50V disposed therebetween.

Each of the completely-fixing ribs 114 on the body 110 is formed into a U-shape along the inner periphery of the body 110 such that the distance between upper half portions of the completely-fixing rib 114 formed respectively on the opposed side walls 112 and 113 is constant.

Two pairs of provisionally-fixing ribs 115 (arranged in two lines (that is, in two planes)) for being engaged in the grooves 50V in the outer periphery of the corrugated tube 50 are formed respectively on the inner surfaces of the opposed side walls 112 and 113 of the body 110, and are disposed between the two completely-fixing ribs 114. The distance between each pair of provisionally-fixing ribs 115 formed respectively on the opposed side walls 112 and 113 is gradually decreasing toward the upper side so that the provisionally-fixing ribs 115, when engaged in the groove 50V of the corrugated tube 50, can provisionally fix the corrugated tube 50 to prevent this corrugated tube 50 from moving toward an upper opening of the body 110.

Further, a pair of pressing walls 160 are provided between the two pairs of provisionally-fixing ribs 115 arranged in the two lines, and are adapted to be pressed against an outer peripheral surface of that ridge 50T of the corrugated tube 50 disposed between the two grooves 50V in which the provisionally-fixing ribs 115 are engaged. The distance between the pair of pressing walls 116 formed respectively on the opposed side walls 112 and 113 is gradually decreasing toward the upper side so that the pressing walls 116, when pressed against the outer peripheral surface of the ridge 50T of the corrugated tube 50, can provisionally fix the corrugated tube 50 to prevent this corrugated tube 50 from moving toward the upper opening of the body 110.

In this comparative wire harness lead-out portion 100, the provisional fixing of the corrugated tube 50 is effected by the two pairs of provisionally-fixing ribs 115 arranged in the two lines and the pair of pressing walls 116 arranged in the single line between the two pairs of provisionally-fixing ribs 115. Therefore, the length required for effecting the provisional fixing is a length covering three consecutive ridges of the corrugated tube 50.

On the other hand, in the wire harness lead-out portion 1 of the invention, the provisional fixing of the corrugated tube 50 is effected by the pair of provisionally-fixing ribs 15 arranged in the single line and the pressing walls 16 disposed at the opposite sides of the provisionally-fixing ribs 15, and therefore the range required for the provisional fixing can be changed from to a length covering three consecutive ridges of the corrugated tube 50 to a length covering two consecutive ridges, and thus can be reduced by an amount corresponding to one ridge.

Therefore, the length of the wire harness lead-out portion 1 of the protector can be reduced, and this contributes to the saving of natural resources. And besides, since the wire harness lead-out portion 1 can thus be reduced, the amount of the wire harness to be received within the protector can be increased, or the wire harness can be more freely arranged and installed when the protector is mounted on a vehicle.

Figure 4:
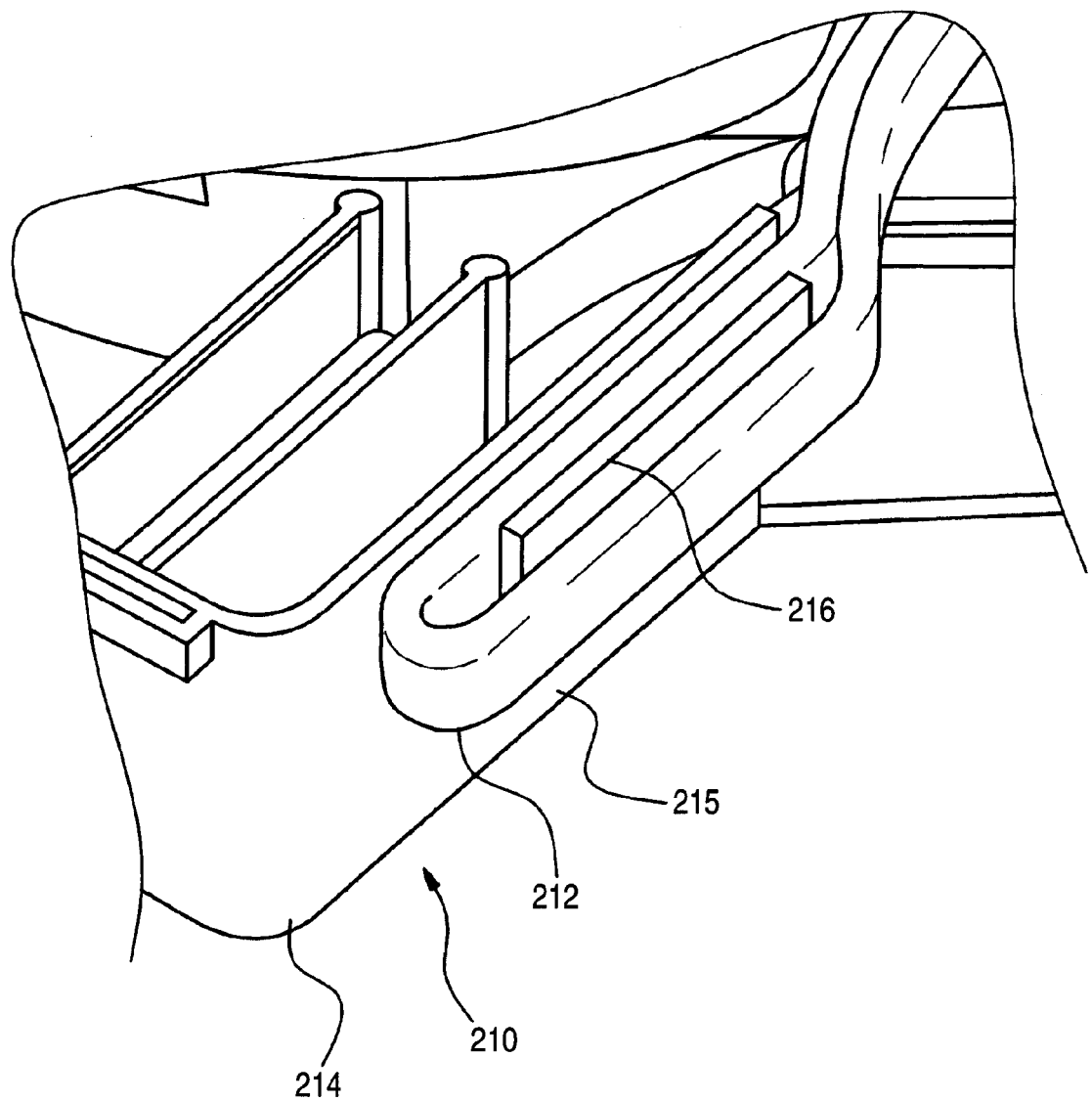
FIG. 4 is a perspective view of an important portion of a protector for an engine ignition circuit provided in accordance with a second embodiment of the invention.
Figure 5:
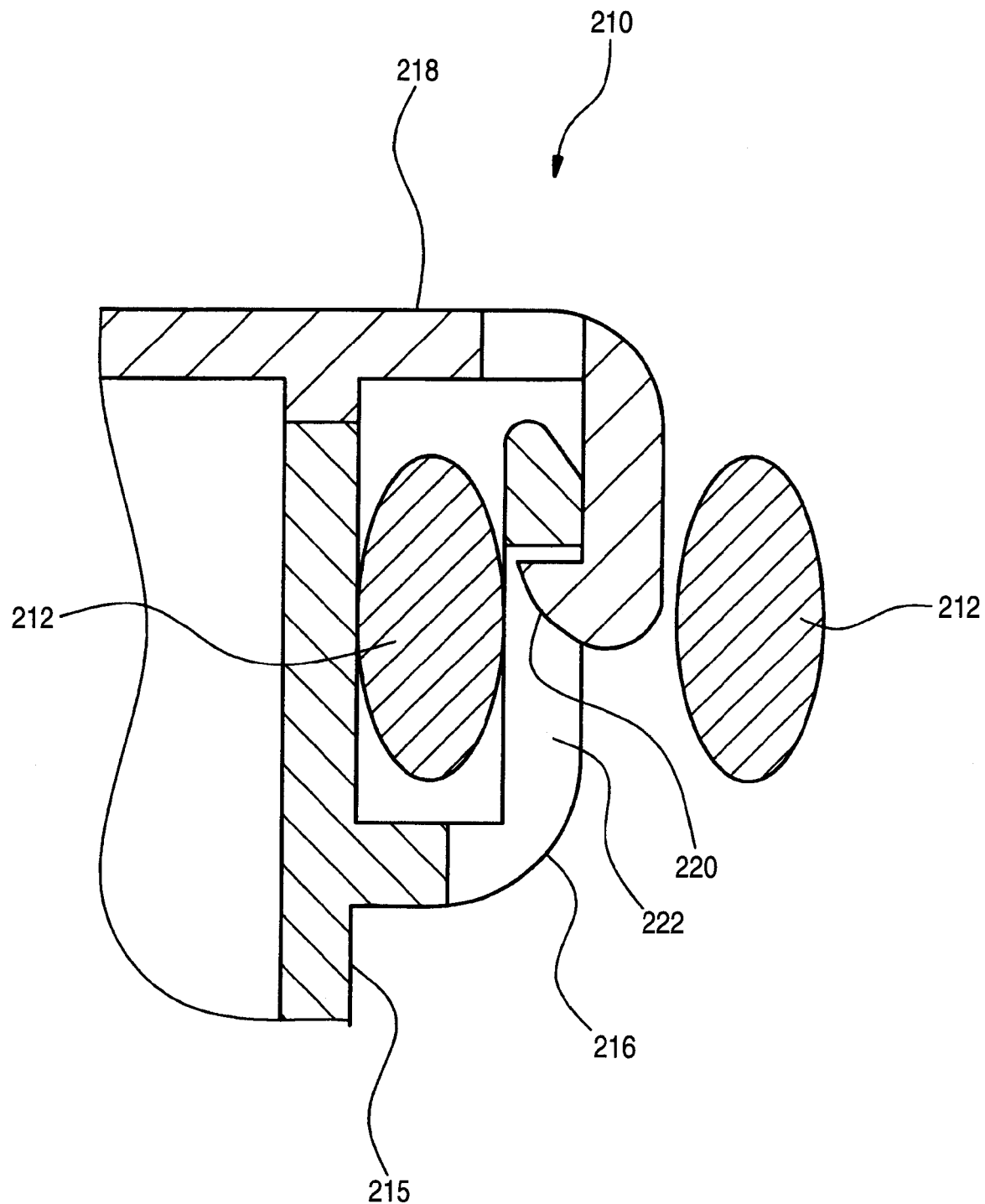
FIG. 5 is a cross-sectional view of an important portion of the protector of the second embodiment.
Figure 6:
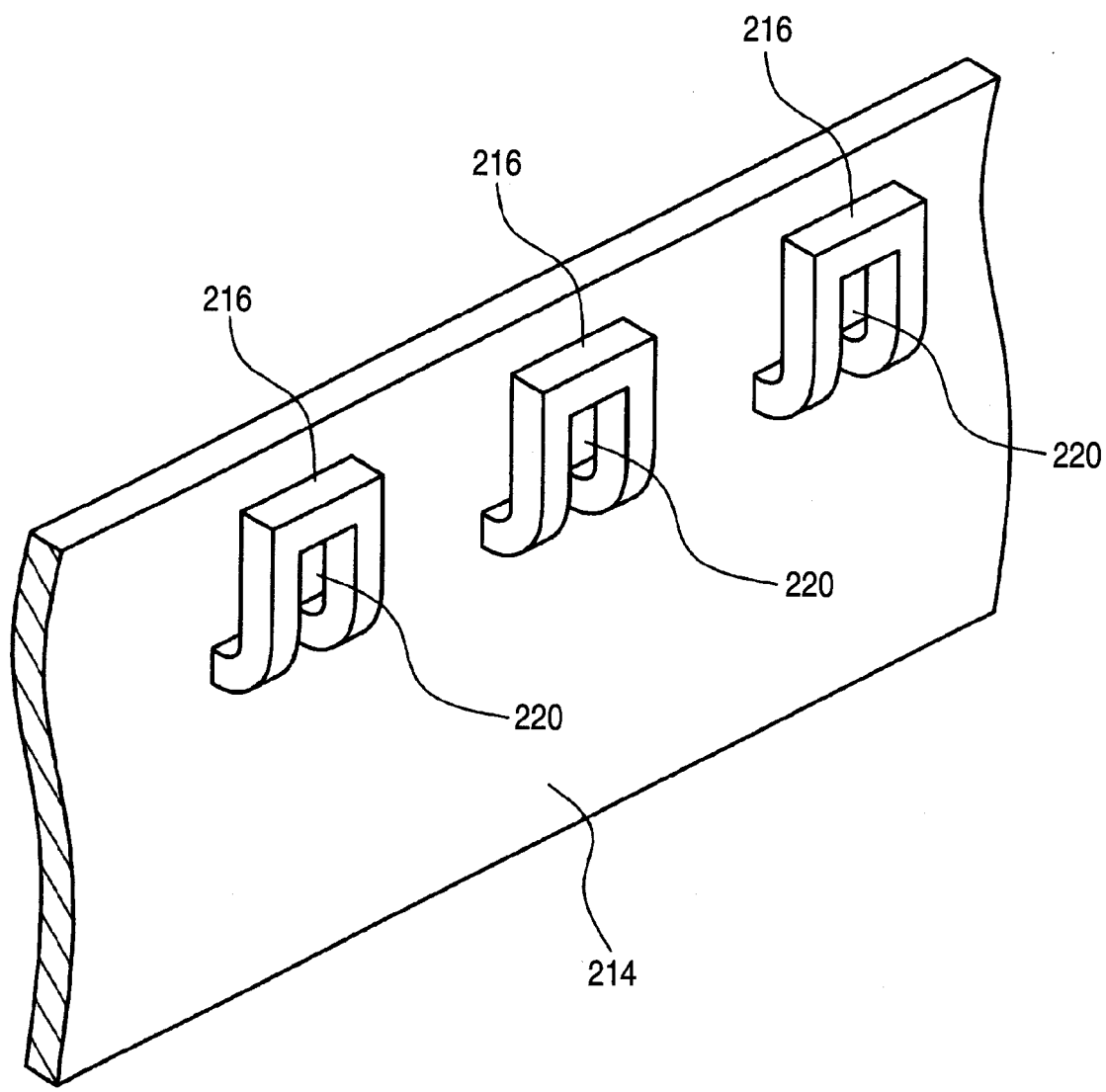
FIG. 6 is a perspective view of an important portion of a modified form of the invention.

Next, a second embodiment of the present invention will now be described with reference to FIGS. 4 to 6. FIG. 4 is a perspective view of an important portion of a protector for an engine ignition circuit provided in accordance with the second embodiment of the invention, and FIG. 5 is a cross-sectional view of an important portion of the protector.

As shown in FIG. 4, the protector 210 includes a housing 214 which receives an engine ignition circuit (not shown) therein to protect the same, and this housing 214 also receives part of a wire harness connecting the ignition circuit to an ignition plug. As shown in FIG. 5, one wire 212 used for detection purposes is extended from the wire harness, and is spread into a loop-shape, and an ignition timing of the engine is inspected by the use of a timing light.

A wire holding portion 216 of a U-shaped cross-section is formed on a side face 215 of the housing 214 of the protector 210. The wire holding portion 216 has a cavity or space smaller in width than the detection wire 212 extending from the interior of the housing 214. By press-fitting the detection wire 212 into this cavity, the wire 212 is held by the wire holding portion 216. The wire holding portion 216 is formed into an elongated shape, and extends in a direction of installation of the wire which is a longitudinal direction of the housing side face 215, and therefore this wire holding portion 216 holds the wire 212 over a predetermined length.

The wire 212 held by the wire holding portion 216 is folded back at an end portion, and is superposed on itself through the wire holding portion 216, and is returned into the interior of the housing 214. Therefore, except when effecting the inspection, the wire 212 extending from the interior of the housing 214 is fixed in a folded, superposed condition to the side face 215 of the housing 214, and extends along this side face 215.

The upper side of the housing 214 is open, and a lid 218 is put on the top of the housing 214 to close an upper opening, thereby protecting an inspection circuit. The lid 218 projects to be disposed above the wire holding portion 216, and a claw 220 formed at an end portion of the lid 218 is engaged with an edge of an engagement hole 222 formed in the wire holding portion 216. An upper open portion of the wire holding portion 216 is closed by the lid 218, and therefore even when the wire 212 is pulled upwardly with a large force, the wire 212 will not be withdrawn from the wire holding portion 216.

When an ignition timing of the engine is to be inspected, the superposed wire 212 is spread into a loop-shape as shown in FIG. 4. At this time, the open portion of the wire holding portion 216 is closed by the lid 218, and therefore the wire 212 will not be withdrawn from the wire holding portion 216, and the operation for spreading the wire 212 into the loop-shape can be easily carried out. After the wire 212 is spread into the loop-shape, a loop portion of the wire 212 is gripped by a trigger clip of a timing light so as to detect an ignition signal.

After the necessary inspection is finished, the trigger clip is removed from the wire 212, and the wire 212 formed into the loop-shape is returned into the housing 214, and is again rendered into the folded, superposed condition, and is fixed to the side face 215 of the housing 214.

In the above embodiment, the wire holding portion 216 is formed integrally with the housing 214 of the protector 210, and therefore the wire 212 can be fixed to the protector 210 without using any other jig or the like. And besides, the wire holding portion 216 has the U-shaped cross-section, and has the cavity smaller in width than the wire 212, and therefore the wire 212 can be positively fixedly held in the wire holding portion 216 in a press-fitted condition. Furthermore, since the wire holding portion 216 is integral with the housing 214, the wire holding portion 216 can be easily formed merely by modifying a mold for producing the housing 214.

The single wire holding portion 216 of the elongated construction can be replaced by a plurality of shorter wire holding portions 216 (see FIG. 6) spaced from one another in the wire-installing direction. In this case, the wire 212 is fixed at a plurality of portions thereof to the protector 210, and is folded back at a selected one of the wire holding portions 216, and is superposed on itself. At this time, by suitably selecting the wire holding portion 216 at which the wire 212 is folded back, the length of installation of the wire at the side face 215 of the housing 214 can be adjusted so as to provide a required loop length.

Next, a third embodiment of the present invention will now be described with reference to FIGS. 7 to 11.

Figure 7:
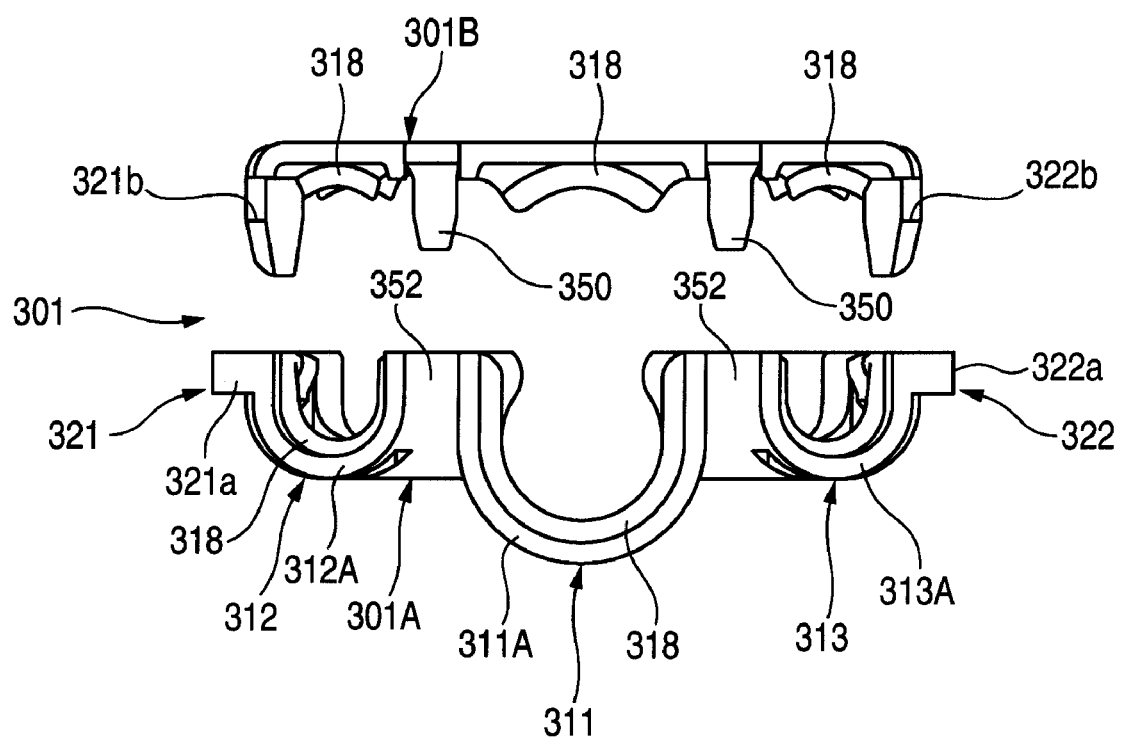
FIG. 7 is a front-elevational view of a third embodiment of a wire harness protector of the invention, showing a condition before a lid is put on a protector body.
Figure 8:
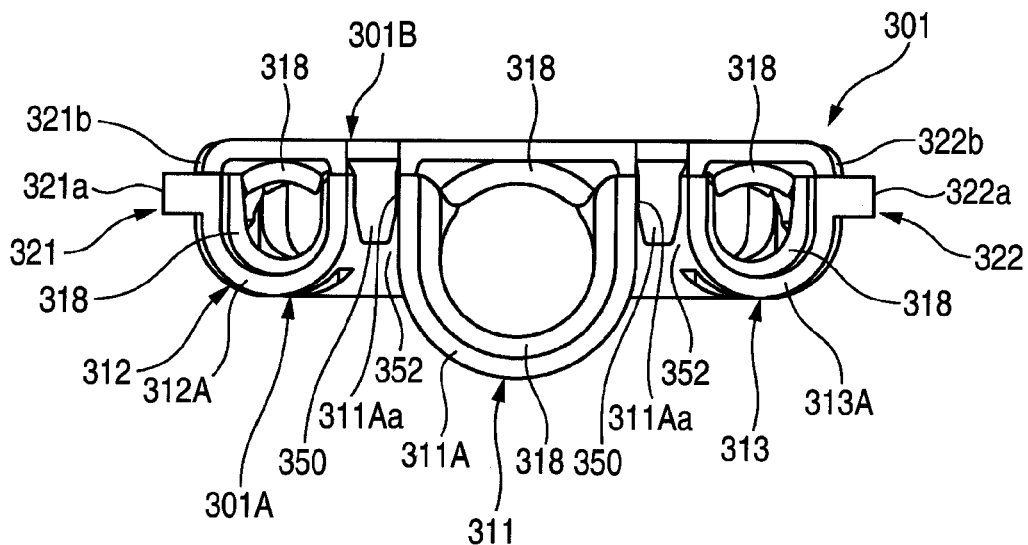
FIG. 8 is a front-elevational view of the wire harness protector, showing a condition in which the lid is put on the protector body.
Figure 9:
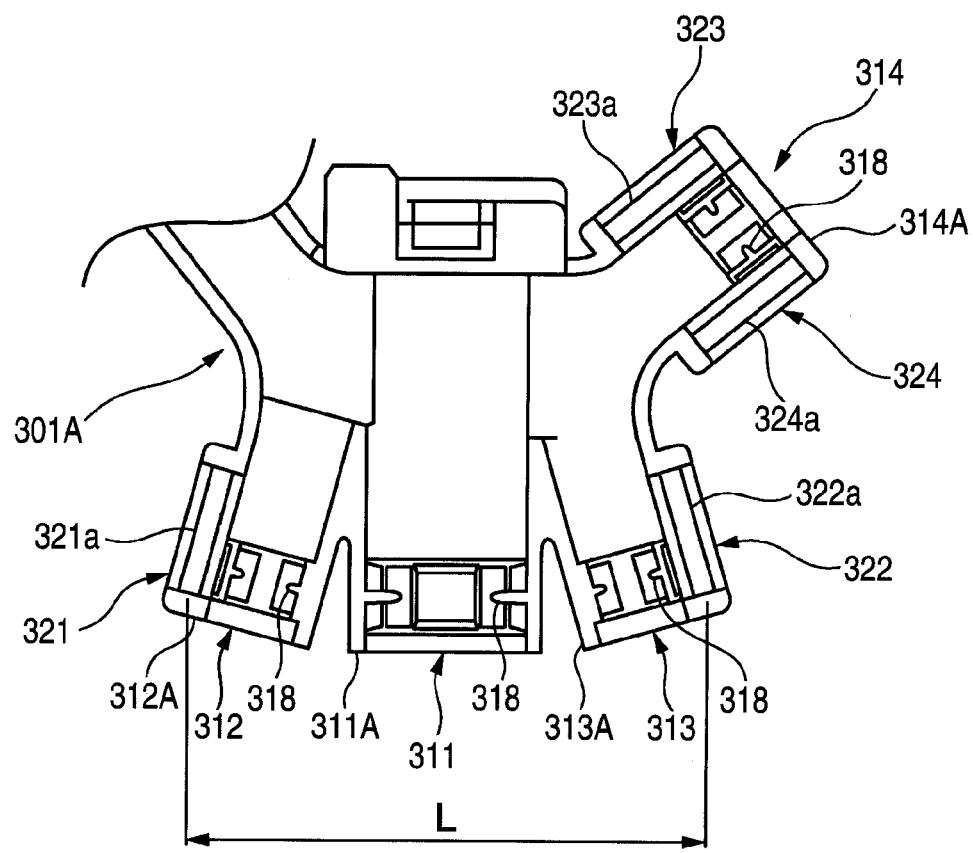
FIG. 9 is a plan view of the protector body.

FIG. 7 is a front-elevational view of the third embodiment of a wire harness protector of the invention, showing a condition before a lid is put on a protector body, FIG. 8 is a front-elevational view of the wire harness protector, showing a condition in which the lid is put on the protector body, and FIG. 9 is a plan view of the protector body.

This wire harness protector 301 includes the protector body 301A which is open at its upper side and has a wire installation path (that is, a wire installation space) formed therein, the lid 301B adapted to be put on the protector body 301A to close an upper opening in the protector body 301A, and lock mechanisms (fixing members) 321, 322, 323 and 324 which are provided at the protector body 301A and the lid 301B and can lock the protector body 301A and the lid 301B to each other when the lid 301B is put on the protector body 301A.

The protector body 301A and the lid 301B are separate from each other, and are resin-molded products, respectively. The lock mechanisms 321, 322, 323 and 324 includes respective frame-like lock portions 321a, 322a, 323a and 324a formed integrally on the protector body 301A, and respective lock claws 321b, 322b, 323b and 324b formed integrally on the lid 301B. When the lid 301B is put on the upper side of the protector body 301A, the lock claws 321b, 322b, 323b and 324b are fitted respectively in the frame-like lock portions 321a, 322a, 323a and 324a, so that the lid 301B and the protector body 301A are locked to each other. The showing of the lock claws 323b and 324b of the lid 301B is omitted from the drawings.

The protector body 301A includes three trough-shaped wire lead-out portions 311, 312 and 313 arranged in a row and oriented in the same direction, and a trough-shaped wire lead-out portion 314 oriented in a different direction (that is, in a direction different from that of the lead-out portions 311, 312 and 313). The wire lead-out portions 311, 312, 313 and 314 include U-shaped peripheral walls 311A, 312A, 313A and 314A, respectively, and a rib (corrugated tube-fixing portion) 318 is formed on an inner surface of each peripheral wall 311A, 312A, 313A, 314A, and is disposed near to a distal end (or outlet end) thereof, and is adapted to be fitted in a concave groove in a corrugated tube fitted on an outer periphery of an associated wire.

Also, ribs (corrugated tube-fixing portions) 318 are formed respectively on those portions of the lid 301B corresponding respectively to the ribs 318 of the wire lead-out portions 311, 312, 313 and 314, and cooperate with the respective ribs 318 of the protector body 1A to hold the respective corrugated tubes.

The lock mechanisms 323 and 324 are provided respectively at opposite sides (that is, side wall portions of the U-shaped peripheral wall 314A) of the wire lead-out portion 314 oriented in the different direction since a sufficient space is available there.

As shown in FIG. 9, a sufficient space is not available at opposite sides of each of the three juxtaposed wire lead-out portions 311, 312 and 313 (oriented in the same direction) except at the outer sides of the opposite-end (i.e., left and right) wire lead-out portions 312 and 313, and therefore the frame-like lock portions 321a and 322a are formed only on outer side walls of the opposite-end wire lead-out portions 312 and 313, respectively. However, slight spaces are available respectively at outer sides of opposite side walls 311Aa and 311Aa of the central wire lead-out portion 311, and therefore insertion spaces 352 are secured there.

Projecting piece portions 350 are formed on the lid 301B, and are inserted respectively into the insertion spaces 352, and when the lid 301B tends to be lifted at the central wire lead-out portion 311, the projecting piece portions 350 are pressed respectively against the side walls 311Aa of the central wire lead-out portion 311 in accordance with the bending of the lid 301B, thereby limiting the lifting of the lid 301B. The projecting piece portions 350 are formed into such a shape as to be smoothly inserted into the respective insertion spaces 352 (provided respectively at the opposite sides of the central wire lead-out portion 311) when the lid 301B is put on the protector body 301A.

Next, the operation will be described. In this protector 301, the wires are received in the wire installation path formed within the protector body 301A, and are led out respectively from the wire lead-out portions 311, 312 and 313, and in this condition the lid 301B is put on the protector body 301A, and is locked thereto by the lock mechanisms 321, 322, 323 and 324, and by doing so, the wires can be protected. At this time, the ribs 318 on the protector body 301A and the ribs 318 on the lid 301B are engaged in the concave grooves of the corrugated tubes mounted on the outer peripheries of the respective wires, and therefore the corrugated tubes can be retained.

And besides, when the lid 301B and the protector body 301A are locked to each other, the projecting piece portions 350 formed on the lid 301B are inserted respectively into the insertion spaces 352 provided at the protector body 301A. Therefore, in this condition, when a force tending to lift the lid 301B at the central wire lead-out portion 311 acts on the lid 301B, the lid 301B is bent such that its central portion is lifted, since the opposite ends of the lid 301B are fixed by the lock mechanisms 321 and 322. However, as the lid 301B is thus bent, the projecting piece portions 350 are pressed against the opposite side walls 311Aa of the central wire lead-out portion 311, and therefore the bending of the lid 301B is limited by this frictional resistance, so that the lifting of the central portion of the lid 301B can be limited.

Namely, the lifting of the central portion of the lid 301B can be limited by the action of the projecting piece portions 350, and therefore the functions of the ribs 318 on the protector body 301A as well as the functions of the ribs 318 on the lid 301B will not be adversely affected, and the displacement and disengagement of the corrugated tubes can be positively prevented.

Figure 10:
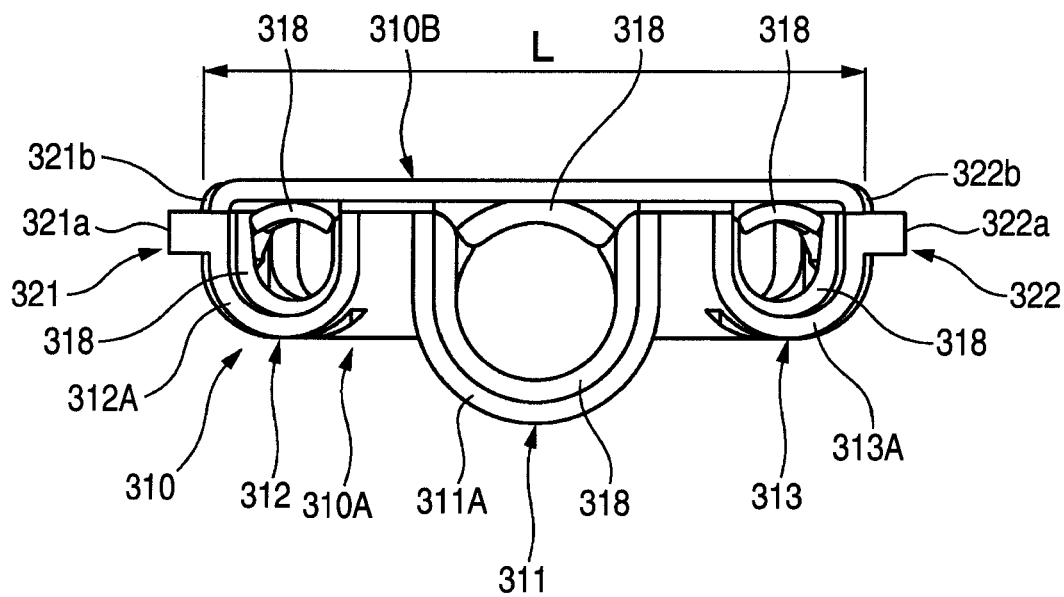
FIG. 10 is a front-elevational view of a comparative protector shown for explaining advantages of the present invention.
Figure 11:
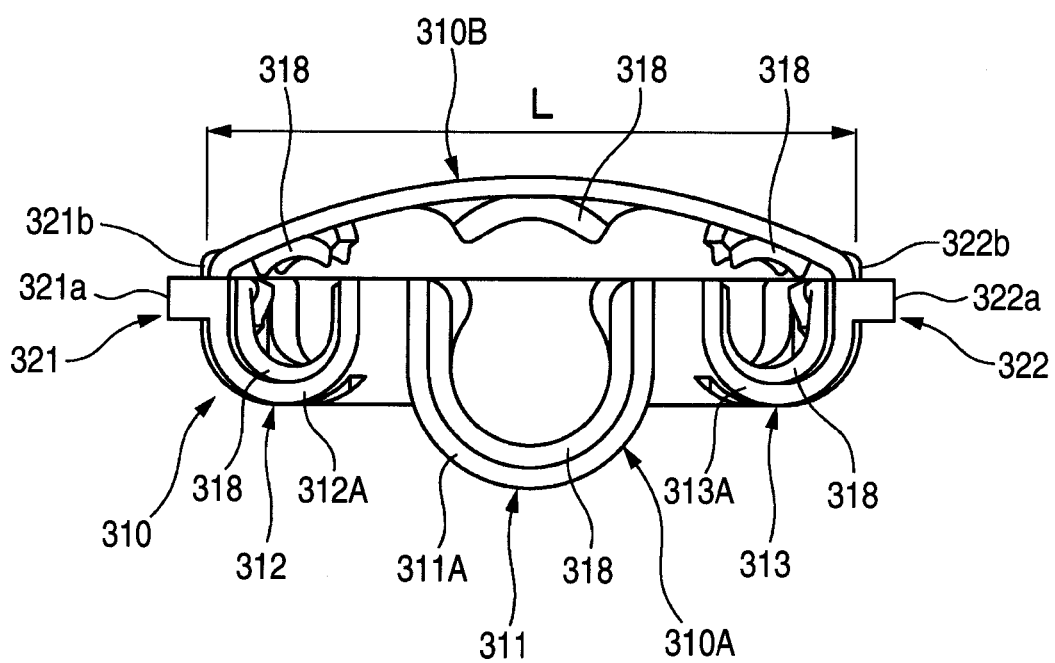
FIG. 11 is a front-elevational view of the comparative example, showing a problem thereof.

Here, in order to further explain the advantages of the present invention, a comparative example is shown in FIGS. 10 and 11. FIG. 10 is a front-elevational view of this comparative protector, and FIG. 11 is a front-elevational view showing a problem with this comparative protector.

The comparative protector 310 includes a protector body 310A, and a lid 310B, and is similar to the protector 301 of the above embodiment except that the projecting piece portions 350 (see FIGS. 7 and 8) are not provided. Therefore, identical constituent elements will be designated by identical reference numerals, respectively, and description thereof will be omitted.

Lock mechanisms 321 and 322 are provided only at outer side walls of opposite-end wire lead-out portions 312 and 313 among three wire lead-out portions 311, 312 and 313 arranged in a row and oriented in the same direction. When a force tending to lift the lid 310B at the central wire lead-out portion 311 acts on the lid 310B, there is a possibility that a central portion of the lid 310B is bent to be lifted as shown in FIG. 11, since the lid 310B is fixed merely at its opposite ends such that the distance L between these fixing portions is relatively long. If this occurs, the retaining of the wire in the central wire lead-out portion 311 becomes insufficient, and in the case where a corrugated tube is fitted on the wire, it is possible that the corrugated tube is displaced or disengaged.

On the other hand, in the protector 301 of the invention shown in FIGS. 7 and 8, the projecting piece portions 350 formed on the lid 301B are inserted respectively into the insertion spaces 352 provided respectively at the opposite sides of the central wire lead-out portion 311 of the protector body 301A, and therefore the above-mentioned lifting of the lid 301B can be prevented. And besides, it is only necessary to provide the projecting piece portions 350, and it is not necessary to provide any additional lock mechanism, and therefore the locking operation will not become cumbersome.

Next, a fourth embodiment of the present invention will now be described in detail with reference to FIGS. 12 and 13.

Figure 12A:
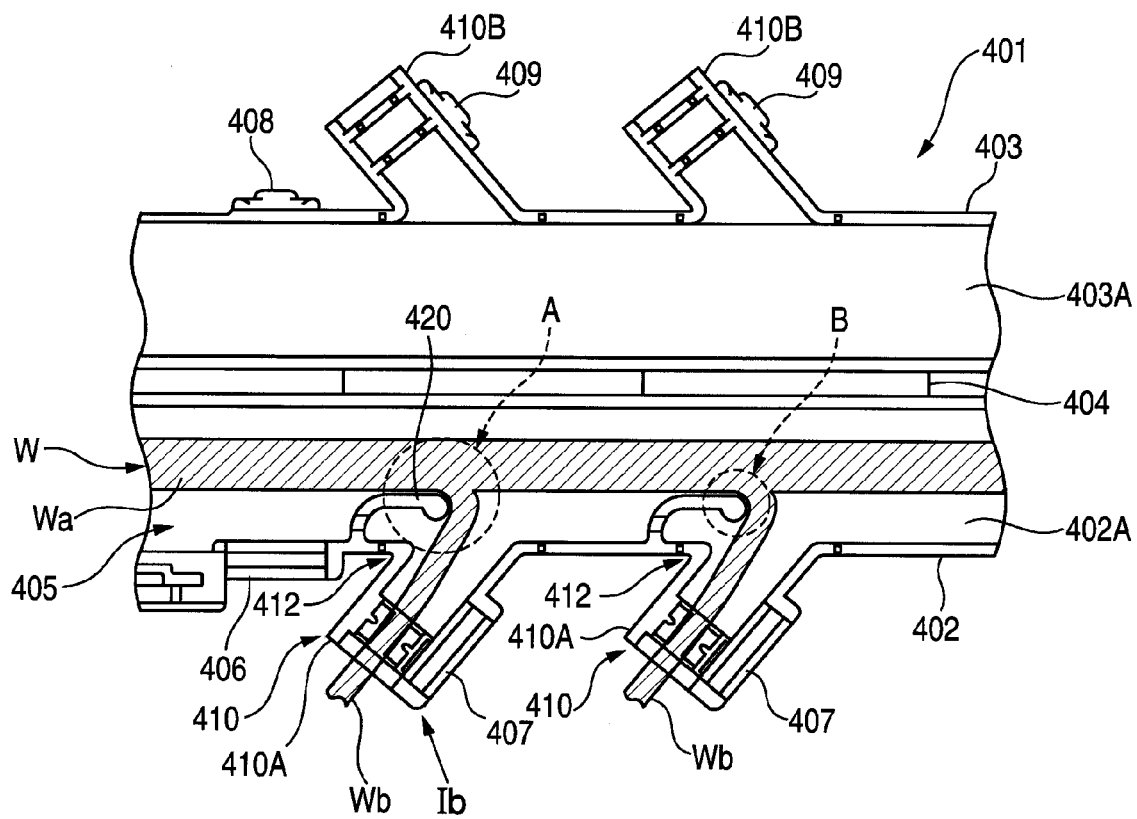
FIGS. 12A and 12B show the construction of a fourth embodiment of a protector of the present invention.
Figure 12B:
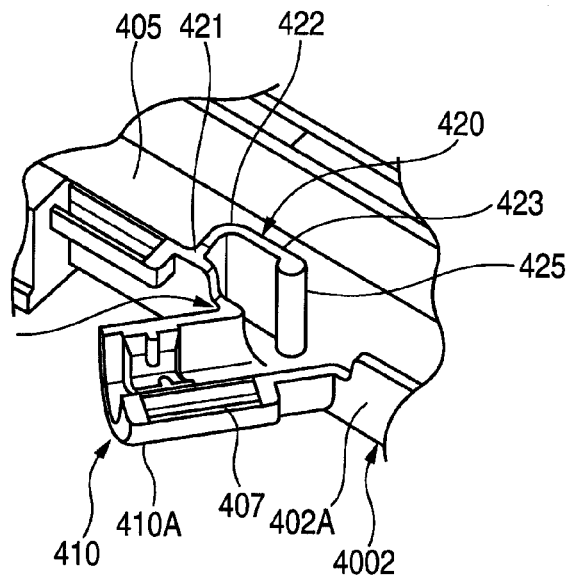

FIGS. 12A and 12B show the construction of a protector of this embodiment, and FIG. 12A is a plan view showing an open condition of a lid, and FIG. 12B is an enlarged perspective view of a portion indicated by arrow Ib of FIG. 12A.

This wire harness protector 401 includes a protector body 402 including a peripheral wall of a U-shaped cross-section which is open at its upper side and defines a wire installation path, and a lid 403 adapted to be put on the protector body 402 to close an upper opening in the protector body 402. The protector body 402 and the lid 403 are interconnected by a hinge 404 such that the protector body 402, the lid 403 and the hinge 404 are formed into an integral construction as a one-piece resin-molded product. The lid 403 can be pivotally moved while bending the hinge 404, and can close the upper opening of the protector body 402, and when the lid 403 is pivotally moved while bending the hinge 404, the protector body 402 and the lid 403 can be locked to each other, with the lid 403 held in a closed condition. Lock members 406, 407, 408 and 409 for locking the two to each other are provided at those portions of the protector body 402 and lid 403 remote from the hinge 404.

A plurality of branch wire lead-out portions 410 are provided at that side portion of the wire harness protector 401 facing away from the hinge 404. Peripheral walls 410A of a U-shaped cross-section (which are relatively deep) respectively defining main portions (lower portions) of the branch wire lead-out portions 410 are formed at the protector body 402, while peripheral walls 410B of a U-shaped cross-section (which are relatively shallow) respectively defining the remaining portions (upper portions) of the branch wire lead-out portions 410 are formed at the lid 403.

The peripheral walls 410A of the branch wire lead-out portions 410 on the protector body 402 are connected to a side wall portion of the peripheral wall 402A forming the main wire installation path 405 for receiving a main wire portion Wa of a wire harness W. In this case, the peripheral wall 410A of each branch wire lead-out portion 410 is connected obliquely (in a U-turn manner when it is seen as a wire installation path) to a lower portion of the peripheral wall 402A forming the main wire installation path 405. Similarly, the peripheral walls 410B of the branch wire lead-out portions 410 on the lid 403 are connected to a side wall portion of a peripheral wall 403A forming the main wire installation path 405 for receiving the main wire portion Wa of the wire harness W. Each branch wire lead-out portion 410 has a wire installation path communicating with the main wire installation path 405. When the protector body 402 and the lid 403 are locked together, lower edges of the peripheral walls 3A and 410B of the lid 403 butt respectively against upper edges of the peripheral walls 402A and 410A of the protector body 402.

Pressing piece portions 420 are formed on and project respectively from predetermined portions of an inner surface of the side wall portion of the peripheral wall 402A of the protector body 402, and press the wire harness (wires) W, installed in the main wire installation path 405, away from this side wall portion in a direction of the width of the wire installation path 405 to hold the wire harness W apart from the side wall portion. The pressing piece portions 420 are provided at regions where the wire installation path of the branch wire lead-out portion 410 extends from the main wire installation path 405. More specifically, each pressing piece portion 420 is formed on the inner surface of the side wall portion of the peripheral wall 402A forming the main wire installation path 405, and is disposed at an inner side of an acutely-bent connection portion 412 of the peripheral wall 410A of the corresponding branch wire lead-out portion 410.

This pressing piece portion 420 is in the form of a blade-like spring piece which projects from the inner surface of the side wall portion of the peripheral wall 402A of the protector body 402, and then is curved into an L-shape from an upstream side toward a downstream side in the wire installation direction. Namely, the pressing piece portion 420 includes a proximal end portion 421 joined to the inner surface of the side wall portion of the peripheral wall 402A of the protector body 402, an L-shaped bent portion 422 extending from the proximal end portion 421, and a distal end portion 423 extending to a region disposed near to a widthwise-central portion of the branch wire lead-out portion 410. A branch wire guide portion 425 of a cylindrical tubular shape or a cylindrical shape for guiding the branch wire is formed at the distal end of the pressing piece portion 420. The upper edge of the pressing piece portion 420 is higher than the upper edge of the side wall portion of the peripheral wall 410A of the branch wire lead-out portion 410.

Next, the operation will be described. When this wire harness protector 401 is to be used, first, the main wire portion Wa of the wire harness W is received in the main wire installation path 405 of the protector body 402, and branch wires Wb branching off from the main wire portion Wa are introduced respectively into the branch wire lead-out portions 410, and then are led out respectively from these branch wire lead-out portions 410.

At this time, each pressing piece portion 420 is provided at the inner side of the bent portion (branched into a U-turn shape), and therefore the wire (the main wire portion Wa and the branch wire Wb) is held apart from the side wall portion of the peripheral wall 402A forming the wire installation path 405. Therefore, in the wire installing operation, the wire (the main wire portion Wa and the branch wire Wb) is prevented from being disposed on the edge of the side wall portion, and therefore the wire (the main wire portion Wa and the branch wire Wb) is prevented from being held between (or gripped by) the protector body 402 and the lid 403 when the lid 403 is closed.

Figure 13A:
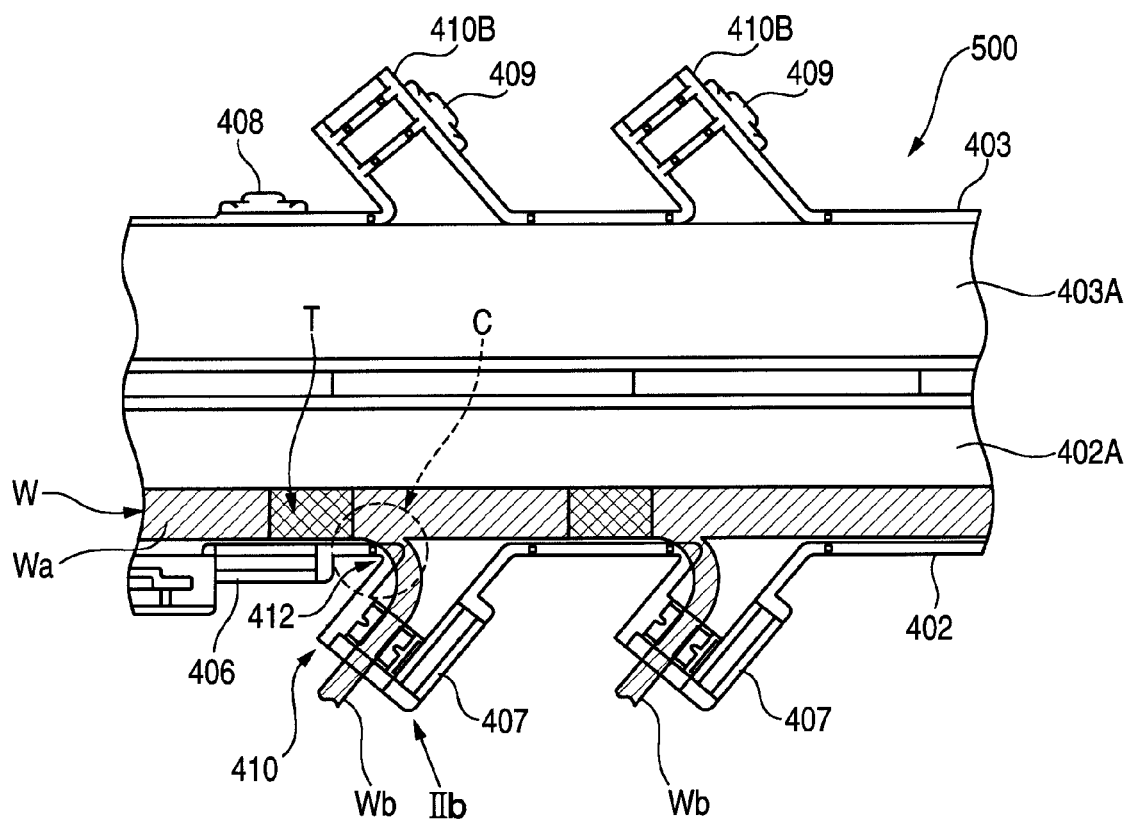
FIGS. 13A and 13B are views showing a comparative protector shown for explaining advantages of the fourth embodiment of the present invention.
Figure 13B:
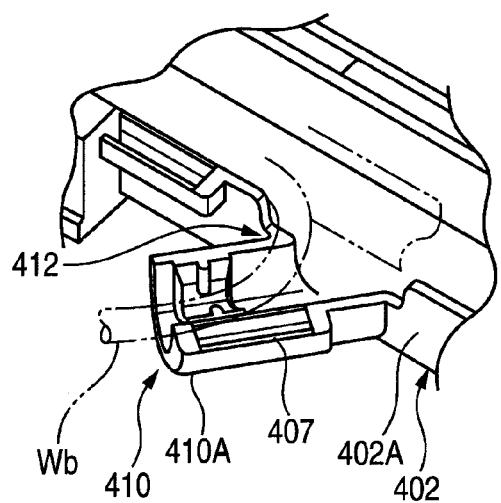

FIGS. 13A and 13B are views of a comparative example shown for explaining advantages of the embodiment of the present invention. FIG. 13A corresponds to FIG. 12A, and FIG. 13B corresponds to FIG. 12B.

This comparative protector 500 includes a protector body 402, and a lid 403, and is similar to the above embodiment of the invention except that the pressing piece portions 420 (see FIGS. 12A and 12B) are not provided. Therefore, identical constituent elements will be designated by identical reference numerals, respectively, and description thereof will be omitted.

In the case of the comparative example having no pressing piece portion 420, there is a strong possibility that at a region where a branch wire Wb, while bent in a U-turn shape, is branched off from a main wire portion Wa of a wire harness W as at a region indicated by arrow C, the wire tends to follow the shortest route at the inner side of the bent portion (for branching purposes), and is disposed on edges of side wall portions of peripheral walls 402A and 410A of the protector body 402. In this case, there is a possibility that the wire is gripped when the lid 403 is closed.

On the other hand, in the embodiment of the invention, the wire (the main wire portion Wa and the branch wire Wb) can be held apart from the side wall portion of the side wall portion 402A (forming the wire installation path 405) by the action of the pressing piece portions 420. Therefore, the wire is prevented from being disposed on the edge of the side wall portion, and the wire is effectively prevented from being gripped when the lid 403 is closed. Particularly when the branch wire Wb is installed at a position lower than the main wire portion Wa, the branch wire is liable to be disposed on the edge of the side wall portion at the branching region. However, this can be avoided by the action of the pressing piece portion 420, and the gripping of the wire is prevented, and the efficiency of the operation can be enhanced.

In this case, the upper edge of the pressing piece portion 420 is higher than the upper edge of the peripheral wall 410A of the branch wire lead-out portion 410 as shown in FIG. 12B, and therefore the wire is positively prevented from being disposed on the edge of the side wall portion. And besides, the pressing piece portion 420 is in the form of the blade-like spring piece, and therefore can resiliently hold the wire apart from the side wall portion. Furthermore, even when the wire is abruptly bent, the pressing piece portion 420 can smoothly guide the wire because of its resiliency.

Furthermore, the branch wire guide portion 425 of a cylindrical tubular shape or a cylindrical shape is formed at the distal end of the pressing piece portion 420, and therefore the area of contact with the wire is increased, so that a pressure applied to the wire is reduced, thereby reducing damage to the wire.

In order to prevent the wire from being disposed on the edge of the side wall portion, a tape winding operation is often applied to those portions of the wire, disposed adjacent respectively to the branch portions, by the use of an adhesive tape T as shown in FIGS. 13A and 13B. In the present invention, however, the pressing piece portion 420 prevents the wire from being disposed on the edge of the side wall portion, and therefore it is particularly not necessary to apply the tape winding operation, and the time and labor required for this tape winding operation are saved, and the omission of the wound tapes contributes to the saving of natural resources. Furthermore, without using the wound tapes, the wire harness can be easily disassembled, and therefore the disassembling ability can be enhanced.

For example, in the above embodiment, the pressing piece portion is provided at the inner side of the bent portion of the branch wire lead-out portion 410 of a U-turn shape. However, the pressing piece portion may be provided at the inner side of an abruptly-bent portion of a simple shape other than the branch portion. In such a case, there can be solved a problem that when installing the wire in an abruptly-bent condition, the wire tends to follow the shortest route at the inner side of the bent portion, and is disposed on the edge of the side wall portion. Therefore, the wire is prevented from being gripped when the lid is closed.

The present invention is not limited to the above embodiments, and various modifications, improvements, etc., can be suitably made. Furthermore, the material, shape, dimensions, number, disposition, etc., of each of the constituent elements of the above embodiment are arbitrary and are not limited in so far as the invention can be achieved.

The present application is based on Japan Patent Application No. 2007-214589 filed on Aug. 21, 2007, Japan Patent Application No. 2007-214590 filed on Aug. 21, 2007, Japan Patent Application No. 2007-214874 filed on Aug. 21, 2007, and Japan Patent Application No. 2007-214875 filed on Aug. 21, 2007, the contents of which are incorporated herein for reference.

What is claimed is:

1. A wire harness lead-out structure, comprising:
a body that includes a containing portion for receiving a wire harness and a corrugated tube covering the wire harness;
a lid that is attached to the body to close an upper opening of the body;
two completely-fixing ribs that are formed on the body and the lid respectively to be engaged in grooves of the corrugated tube to prevent a movement of the corrugated tube in an axial direction of the corrugated tube; and
a provisionally-fixing rib that is formed in a single line on the opposed side walls of the body to be engaged in a single groove of the corrugated tube, and is disposed between the two completely-fixing ribs,
wherein the completely-fixing ribs are arranged in two lines corresponding to two grooves of the corrugated tube, the two grooves being both adjacent to the single groove corresponding to the provisionally-fixing rib;
wherein each of the completely-fixing ribs on the body is formed into a U-shape along an inner periphery of the containing portion so that a distance between upper portions of the completely-fixing rib respectively formed on opposed side walls of the body is constant;
wherein a distance between portions of the provisionally-fixing rib formed on the opposed side walls is gradually decreased toward the upper opening of the body to prevent the corrugated tube from moving toward the upper opening of the body when the provisionally-fixing rib is engaged in the single groove of the corrugated tube;
wherein a first pair of pressing walls is provided among the provisionally-fixing rib and one completely-fixing rib to press a ridge of the corrugated tube, the ridge being disposed adjacent to the grooves corresponding to the one completely-fixing rib;
wherein a second pair of pressing walls is provided among the provisionally-fixing rib and the other completely-fixing rib to press a ridge of the corrugated tube, the ridge being disposed adjacent to the groove corresponding to the other completely-fixing rib; and
wherein a distance between portions of each pair of pressing walls formed respectively on the opposed side walls is gradually decreased toward the upper opening of the body to prevent the corrugated tube from moving toward the upper opening of the body when the pressing walls press the ridges of the corrugated tube.

2. The wire harness lead-out structure according to claim 1, wherein the ridge pressed by the first pair of pressing walls is disposed adjacent to both the groove corresponding to the one completely-fixing rib in the groove corresponding to the provisionally-fixing rib, and
wherein the ridge pressed by the second pair of pressing walls is disposed adjacent to both the groove corresponding to the other completely-fixing rib and the groove corresponding to the provisionally-fixing rib.

* * * * *